July 24, 1962 F. O. HOLLADAY ETAL 3,046,019

INDEXING SYSTEM FOR MAGNETIC RECORDERS

Filed Dec. 10, 1959

INVENTORS
FRED O. HOLLADAY
RICHARD KOBLER
BY George H. Fritzinger
AGENT

United States Patent Office 3,046,019

Patented July 24, 1962

3,046,019

INDEXING SYSTEM FOR MAGNETIC RECORDERS

Fred O. Holladay and Richard Kobler, West Orange, N.J., assignors to McGraw-Edison Company, Elgin, Ill., a corporation of Delaware Filed Dec. 10, 1959, Ser. No. 858,616
4 Claims. (Cl. 274—1)

Figures 1, 2:
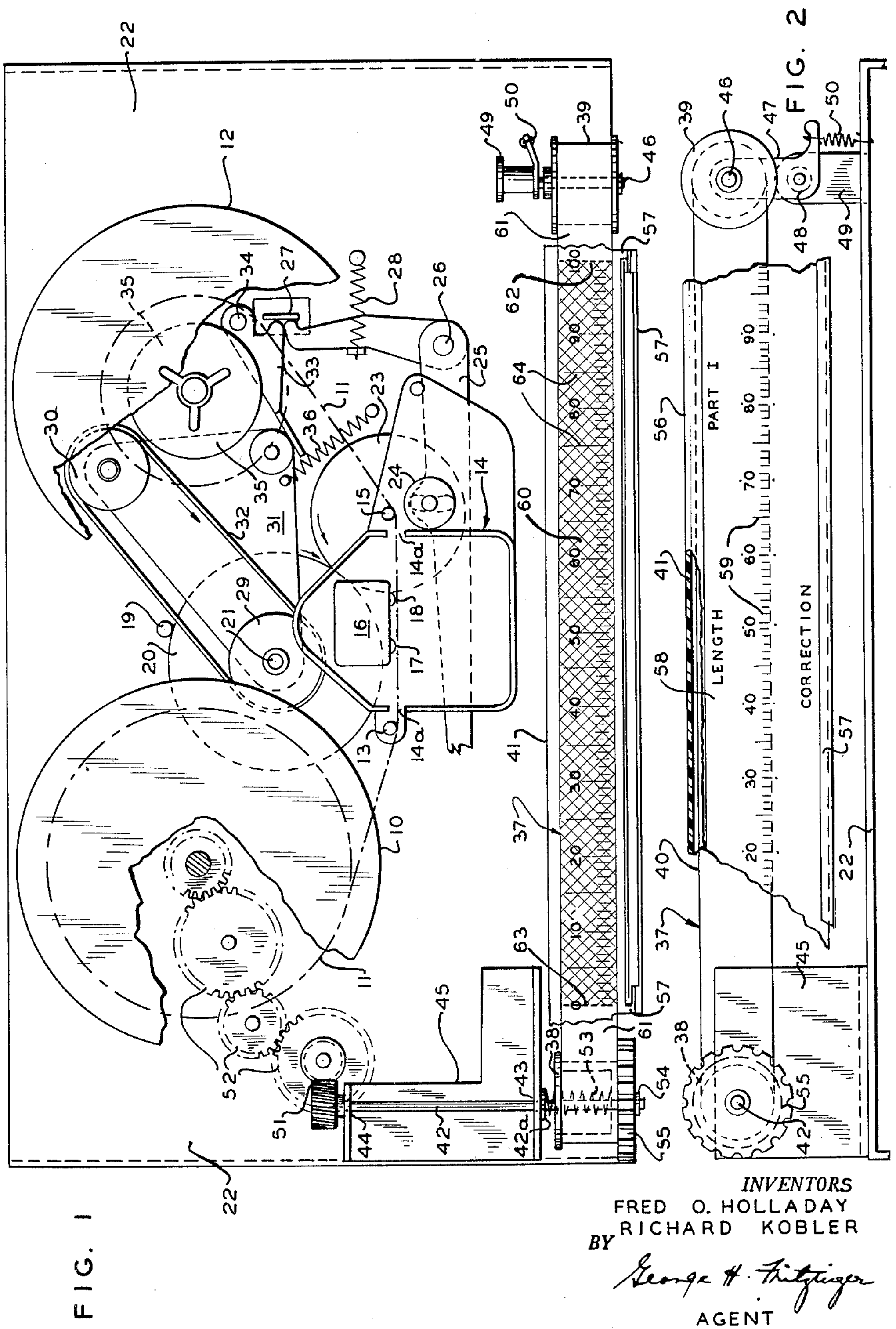

This invention relates to magnetic tape recorders used as dictating machines and more particularly to an improved indexing system for such machines.

Recording machines used for recording dictation and known generally as dictating machines are equipped with indexing systems for enabling the dictator to make registrations in spacial relation to the positioning of the recorder head relative to the record medium to indicate for the benefit of the transcriber the points on the record where "lengths" and "corrections" are made, the term "lengths" being herein employed to mean the points on the record medium where separate items of dictation are started and ended. Typically, an index blank or slip is provided for each record and is of a type adapted to receive registrations in the form of visible marks. In the dictating machines as heretofore commonly used, the record medium is in the form of a cylinder, disk, belt or sheet capable of receiving about 15 minutes of dictation. Such lengths of recording can be indexed with the requisite accuracy on a conveniently sized index slip about six inches long. In magnetic tape machines, however, a single roll of tape is capable of receiving from 30 minutes to 1 hour or more of recordation in a single track along the length of the tape. Such greater length of recording cannot be indexed with the needed accuracy within a 6 inch length, nor is it practical in these machines to employ index slips of any greater length. However, we have overcome this difficulty with the use of a novel indexing system which operates in a novel manner to index a plurality of times along the length of a single index slip during each traverse of the magnetic tape throughout its full length past the recorder head.

An object of our invention is accordingly to provide an improved indexing system for long-playing dictating machines especially of the tape-record type.

Another object is to provide an improved indexing system for a long-playing tape-record dictating machine, which achieves a high degree of accuracy on a conveniently sized index slip within a small space.

A further object is to provide such improved indexing system which is of simple and economical construction.

In carrying out the invention, the movable indexing means is provided in the form of a belt or ribbon trained around two rollers and having a run thereof between the rollers extending along the index slip, wherein the belt is moved through a plurality of lengths of the index slip for each traverse of the record through its full length past the recorder head and wherein the belt carries a plurality of indexing elements spaced from each other by the active length of the index slip.

The foregoing objects and features of the invention will be apparent from the following description and the appended claims.

In the description of our invention, reference is had to the accompanying drawings of which:

FIGURE 1 is a plan view of a tape recording machine incorporating our invention, showing the housing cover removed to illustrate the internal mechanism; and FIGURE 2 is a front elevational view of this machine with parts broken away.

The tape recording machine shown in the drawings has a tape transporting mechanism including a supply reel 10 for a roll of magnetic tape 11 at the left side of the machine and a take-up reel 12 for the tape at the right side of the machine. The tape is lead from the supply reel across a guide post 13, through a translating head housing 14 via slots 14*a* in the sidewalls thereof and next past a drive pin 15 to the take-up reel. In the housing 14 there is a translation head 16 comprising erase poles 17 and record-reproduce poles 18 which contact slidably the magnetic side of the tape under pressure of pads not shown.

The tape drive means comprises a motor shaft 19 in frictional drive engagement with a rubber-tired wheel 20 journaled at 21 to a top plate 22 of the machine. The wheel 20 is in turn in frictional engagement with a wheel 23 secured to the tape drive pin 15 and also journaled to the top plate 22. At the front side of the tape opposite the drive pin 15 there is a rubber idler roller 24 journaled on a bell-crank lever 25 pivoted at 26 to the top plate 22. In the stop position of the drive means the idler roller is held disengaged from the drive pin 15 by a start-stop member 27 shown in its stop position in FIGURE 1. Upon release of the start-stop member in a rightward direction the lever 25 is turned clockwise by a tension spring 28 to press the tape into frictional engagement with the drive pin 15. The overdrive means for the take-up reel 12 comprises a drive pulley 29 on the drive wheel 20, a driven pulley 30 journaled to an arm 31 pivoted to the top plate at the axis 21 of the drive pulley, and a belt 32 intercoupling the two pulleys. Between the arm 31 and the start-stop member 27 is a bell-crank intercoupling lever 33 pivoted at 34 to the top plate 22. In the stop position of the start-stop member 27 the arm 31 is held in a counterclockwise position shown in FIGURE 1 wherein the outer peripheral surface of the belt 32 where it is trained around the pulley 30 is out of engagement with the back side of a friction wheel 35 provided on the shaft of the take-up reel. However, when the start-stop member 27 is released into its start position to frictionally engage the tape with the drive pin 15 as before described, the arm 31 is released and turned clockwise by a tension spring 36 to press the belt 32 into frictional sliding engagement with the wheel 35 so as to apply an overdriving force on the take-up reel in a counterclockwise direction to cause the reel to take up the tape as it is fed out from the drive pin 15.

Extending transversely of the machine along the front thereof is an indexing ribbon 37 trained at its ends around left and right spools 38 and 39. By way of illustrative example, the ribbon is in the form of a closed loop or belt having the top run 40 thereof visible through a translucent cover 41. The left spool 38 has a rearwardly extending shaft 42 journaled in fixed bearings 43 and 44 carried by the upright arms of an upstanding U bracket 45 on the top plate 22. The right spool 39 is on the other hand journaled on a shaft 46 secured to the upper end of a rocker arm 47 pivoted at its lower end in a bearing 48 secured to a lug 49 turned up from the top plate 22. A tension spring 50 is interconnected between a side lug of the rocker arm and the top plate so as to urge the spool 39 rightwardly and maintain the indexing belt under constant tension.

The shaft 42 for the left spool 38 has a permanent drive connection with the shaft of the supply reel 10 by means of a worm gear 51 and a train of spur gears 52 shown in FIGURE 1. However, there is a frictional-slip coupling between the spool 38 and its shaft 42 to enable the spool to be turned manually as desired. For this reason the spool 38 has a free journal on the shaft 42 and a compression spring 53 is provided on the shaft between a retainer ring 42*a* thereon and the spool, so as to urge the spool frictionally in a forward direction against a shoulder 54 on the end of the shaft. A knob 55 is provided on the spool 38 for turning the spool and shifting the index ribbon into a zero starting position after a new roll of tape is installed on the machine.

On the machine in front of the indexing ribbon there is a vertical holder 56 having a turned over edge 57 at the sides and bottom thereof to receive slidably from the top an index slip 58. Preferably, the top edge of a mounted index slip is at about the level of the top run 40 of the indexing belt. The indexing slip has a scale 59 thereon marked for example in divisions of 10 from 0 to 100. The lane lengthwise of the slip above the scale is for "length" marks and that below the scale for "correction" marks. In accordance with the present invention each index slip is provided with a plurality of both "length" and "correction" lanes but in the present illustrative example, one set of length and correction lanes is provided on a front side of the index slip marked "Part I" and the second set of such lanes is provided on the back side of the slip marked "Part II." Thus, the front side of the index slip is used for indexing the first one-half length of the magnetic tape, and the back side of the slip for indexing the remaining length of tape.

A feature of the invention is in providing the indexing ribbon or belt with an indicating line or mark for each set of indexing lanes on the slip and in separating these indicating lines by distances equal exactly to the length of the scale on the index slip. These indicating lines may be formed in any suitable way. For example, the indexing belt may have one portion 60 of one color, say black, equal exactly in length to that of the scale 59 and may have its remaining portion 61 of another color, say red, with sharp transverse lines of demarcation 62 and 63 between the differently colored portions. These lines of demarcation form therefore indicating lines for the present indexing purposes.

After a supply roll 11 of magnetic tape has been installed on the supply reel 10 and the tape has been threaded through the head chamber and secured to the take-up reel, the dictator will turn the knob 55 to bring the first indicating line 62, which is at the leading end of the black portion 60, in registration with zero on the scale 59 of the index slip. To facilitate the dictator in accurately aligning the first indicating line 62 with zero on the scale, the translucent cover plate 41 above the indexing belt is provided with a scale 64 identical with that on the index slip.

During the recording of dictation on the first half length of the tape the indicating line 62 will traverse the length of the scale 59 on the index slip. Whenever the dictator desires to make a length or correction notation he will stop the machine, note where the indicating line 62 registers with the overlying scale 64 and then make a mark on the index slip in the length or correction lane at a distance therealong corresponding to the positioning of the demarcation line 62. When the first one-half length of the tape has traversed the recording head the indexing belt will stand in the position which it occupies in FIGURE 1. The dictator may proceed through this one-half division point with his recording without giving any attention to the indexing system, but before he makes any indexing notations with respect to any point in the second one-half length of the tape he is to reverse the index slip in its holder so as to expose its back or "Part II" side and will then make notations on that side at positions corresponding with that of the second indexing line 63 in the same manner as he did on the first side of the index slip. It is because the indicating lines 62 and 63 on the indexing belt are separated by a distance equal to the length of the scale 59 on the index slip that no timing is necessary as to when the index slip is turned over in its holder.

It will be understood that if a still longer playing record tape is used or if still greater indexing accuracy is desired, the indexing ribbon or belt may have three or more indicating lines identified as by the use of successive differently colored portions on the tape or by lines marked 1, 2, 3 etc. Correspondingly, at least one side of the indexing slip is then also provided with a plurality of lanes for both length and correction marks which may be suitably identified by colors or numbers to correspond to the respective indicating lines on the indexing ribbon.

An advantage of using a ribbon which is rolled at its ends on the spools 38 and 39 in the manner of a scroll instead of a belt as herein particularly illustrated, is that only one run of the ribbon need extend between the spools through the length of the index slip and the ribbon may still have three or more indexing elements spaced by the length of the slip for indexing a corresponding number of times along the length of the slip for each full length of traverse of the tape past the recorder head. The supply roll of ribbon would in this case be initially on the left spool 38 and the right spool would be frictionally overdriven or biased by suitable spring means to take up the ribbon as it is payed out from the supply spool. Since the spool 38 is driven from the supply reel the ribbon would then be payed out at all times in correspondence with the feed of the tape, giving therefore about equal indexing divisions on the index slip for each incremental length of the tape throughout the full length of the tape past the recorder head.

When a recorded tape is to be transcribed the tape is first brought to its starting position with respect to the recorder head and the first indicating line on the indexing ribbon is brought in alignment with zero on the scale of the index slip while the tape is in its starting position. Thereafter, it is only necessary that the transcriber interpret the indexing notations in the different indexing lanes with reference to the respective indicating lines on the indexing ribbon. For example, to find the point on the tape where a notation on Part II has been made, the transcriber will feed the tape through the machine until the second indicatng line on the indexing ribbon is aligned with that notation. Thereupon he will note whether the notation is in a length lane or a correction lane. If the notation is in a "lengtth" lane it will indicate that at that point on the record medium a separate subject matter of dictation, for example, a letter, memorandum, etc. is there started or ended. If the notation is in a "correction" lane it will signify instead that the dictator has there made a correction in the recorded dictation.

As a further modification the portion of the index ribbon and the side of the index slip corresponding to a first-half length of the recording tape may be identically colored for easier association in the mind of the user. Still further, along the same lines, the first-half length of the recording tape may be also of the same color. The succeeding portion of the index ribbon limited permissibly to a length of that of the scale on the index slip and the other side of the index slip, as well as the second one-half portion of the recording tape, may then have some other suitable color. Such a system offers maximum protection against a user mistakenly associating a wrong portion of the index ribbon and/or wrong side of the index slip with any particular portion of the recording tape.

The particular embodiment of our invention herein shown and described is intended to be illustrative and not limitative of our invention since the same is subject to changes and modifications without departure from the scope of our invention, which we endeavor to express according to the following claims.

We claim:

1. In an indexing system for a magnetic-tape recording machine comprising tape transporting means, a recorder head and drive means for advancing said tape past said recorder head: the combination of a pair of spools spaced in line with each other on parallel axes, a coupling with friction-slip clutch means between one of said spools and said drive means, an indexing ribbon trained around said spools, a mounting for receiving replaceably an index slip extending along the run of said ribbon between said spools, said index slip being mounted in a plane substantially at right angles to the plane of said run of the indexing ribbon, said indexing slip having a scale thereon lengthwise thereof, said indexing ribbon having a plurality of indicating marks thereon spaced from each other by the length of said scale, a translucent cover overlying said run of said indexing ribbon and having a scale thereon corresponding to that on the index slip, and said coupling being adapted to advance said indexing ribbon through a multiplicity of lengths of said scale for each traversal of said tape through its full length past said recording head.

2. In an indexing system for a magnetic-tape recording machine comprising tape transporting means, a recorder head and drive means for advancing an elongate tape past said recorder head: the combination of mounting means on said machine for an index slip with a scale having a length relatively short compared to the length of said tape, indexing means comprising a pair of rollers journaled at the ends of a mounted index slip and an indexing ribbon separate from said tape, said indexing ribbon being trained around said rollers with a run of the ribbon extending along said mounted index slip and said ribbon having indexing marks thereon spaced from each other by the length of scale on said indexing slip, and means providing a friction slip coupling between said tape driving means and one of said rollers having a step-down transmission ratio for advancing said ribbon through a distance only several times greater than the length of said scale responsive to an advance of the tape through its full length past said head.

3. The indexing system as set forth in claim 2 wherein said friction slip coupling is adapted to advance said ribbon through a distance equal to twice the length of said scale responsive to an advance of the tape through its full length past said head, and wherein said ribbon has one portion of the length of said scale of one color and has the remaining portion of another color with said different colored portions having junction lines therebetween transverse of the tape and constituting said index marks.

4. In an indexing system for a magnetic-tape recording machine comprising tape transporting means, a recorder head and drive means for advancing said tape past said recorder head: the combination of mounting means on said machine for an index slip having a scale thereon, indexing means comprising spools at the respective ends of a mounted index slip and a ribbon along said mounted index slip trained at its ends around said spools, said ribbon having indexing marks thereon spaced from each other by the length of said scale and said indexing ribbon comprising a closed loop trained around said spools with one run thereof exposed along said mounted index slip, a coupling including clutch means between said drive means and said indexing means for advancing said indexing ribbon responsive to the advance of the tape past said recorder head, and means in said coupling providing a transmission ratio causing said indexing ribbon to be moved through a distance a multiple times greater than the length of said scale responsive to an advance of the tape through its full length past said head.

References Cited in the file of this patent

UNITED STATES PATENTS

| | | |
|---|---|---|
| 2,307,259 | Fling | Jan. 5, 1943 |
| 2,318,098 | Rieber | May 4, 1943 |
| 2,568,681 | Kuhlik | Sept. 18, 1951 |
| 2,898,112 | Flower | Aug. 4, 1959 |
| 2,920,148 | Munroe | Jan. 5, 1960 |

OTHER REFERENCES

Publication: Audio Devices, Inc., May 1954, Bulletin No. 209.